United States Patent
Lu et al.

(10) Patent No.: US 12,244,787 B2
(45) Date of Patent: Mar. 4, 2025

(54) CONTROL METHOD OF LIGHT FIELD DISPLAY

(71) Applicant: Coretronic Corporation, Hsin-Chu (TW)

(72) Inventors: Chih-Hung Lu, Hsin-Chu (TW); Chung-Jen Ou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 124 days.

(21) Appl. No.: 18/076,410

(22) Filed: Dec. 7, 2022

(65) Prior Publication Data

US 2023/0209039 A1   Jun. 29, 2023

(30) Foreign Application Priority Data

Dec. 23, 2021   (CN) .......................... 202111587855.5

(51) Int. Cl.
*H04N 13/39* (2018.01)
*G02B 30/10* (2020.01)
*H04N 13/398* (2018.01)

(52) U.S. Cl.
CPC ........... *H04N 13/398* (2018.05); *G02B 30/10* (2020.01)

(58) Field of Classification Search
None
See application file for complete search history.

(56) References Cited

U.S. PATENT DOCUMENTS

| 2017/0301313 A1* | 10/2017 | Perreault | G02B 3/14 |
| 2021/0168350 A1* | 6/2021 | Zhang | G02B 30/10 |
| 2023/0077212 A1* | 3/2023 | Zou | G02B 30/50 |

FOREIGN PATENT DOCUMENTS

| CN | 107340669 | 10/2019 |
| TW | 202016604 | 5/2020 |

OTHER PUBLICATIONS

J. C. Stevens et al., "Brightness Function: Effects of Adaptation", Journal of the Optical Society of America, Mar. 1963, pp. 375-385.
Webvision, "Temporal Resolution by Michael Kalloniatis and Charles Luu", retrieved on Dec. 5, 2022, https://webvision.med.utah.edu/book/part-viii-psychophysics-of-vision/temporal-resolution/.

(Continued)

*Primary Examiner* — Joseph R Haley
(74) *Attorney, Agent, or Firm* — JCIPRNET

(57) ABSTRACT

A control method of a light field display is provided. A control unit inputs a focal length signal to a zoom lens, so that the zoom lens is periodically switched among corresponding specific focal lengths. The control unit inputs a corresponding display signal to a display unit of a display module according to one of the specific focal lengths, and the display module generates one of image lights, the image lights respectively have different imaging distances corresponding to the specific focal lengths after passing through the zoom lens. The control unit inputs a corresponding response time signal to the display module according to one of the specific focal lengths, the one of image lights emitted by the display module passes through the zoom lens within one of response times, and the light field display projects the one of image lights to form an image at the corresponding imaging distance.

11 Claims, 4 Drawing Sheets

(56) References Cited

OTHER PUBLICATIONS

Color Vision, "adaptation, anchoring & contrast", retrieved on Dec. 5, 2022, htttps://www.handprint.com/HP/WCL/color4.html.
Mkrgeo-blog, "The role of contrast in ability of human vision", retrieved on Dec. 5, 2022, http://www.mkrgeo-blog.com/the-role-of-contrast-in-ability-of-human-vision/.

* cited by examiner

CONTROL METHOD OF LIGHT FIELD DISPLAY

CROSS-REFERENCE TO RELATED APPLICATION

This application claims the priority benefit of China application serial no. 202111587855.5, filed on Dec. 23, 2021. The entirety of the above-mentioned patent application is hereby incorporated by reference herein and made a part of this specification.

BACKGROUND

Technical Field

The invention relates to control method, and particularly relates to a control method of a light field display.

Description of Related Art

Light field near eye display (LFNED) is one of current display technologies capable of solving vergence accommodation conflict (VAC), which may be divided into two frameworks of time multiplexing and spatial multiplexing. The time multiplexing framework uses a zoom lens element to repeatedly change a position of a virtual image within a short period of time, so that a human eye has a multi-depth perception, where the zoom lens element of the time multiplexing framework may include, for example, a liquid crystal tunable lens, a fluid-based tunable lens with constant volume, a fluid-based tunable lens with variable volume, or a fully elastomeric tunable lens, etc. The spatial multiplexing framework uses a microlens array to project a corresponding parallax image on the display panel. In a current light field near eye display of the spatial multiplexing framework, the microlens array is placed on an OLED display to generate a light field image. The microlens array projects light field sub-images of the display panel to a retina of the user, so that the user may view a virtual light field image composed of a plurality of sub-images stacked with each other. Therefore, imaging quality of the entire microlens array may directly affect an effect of the light field image.

In addition, in the light field near eye display of the time multiplexing framework, control of the zoom lens element is mainly triggered by a clock circuit of a main control board, so that the zoom lens element and image transmission are synchronized (SYNC). Where, the main control board is controlled by current or voltage input according to a type of the zoom lens element. Moreover, a diopter change of the zoom lens element requires a response time, and the input of different step functions and changing frequencies may all affect a time length that the diopter of the zoom lens element enters a steady state after zooming. Therefore, most of the literatures in the past tried to solve this problem by means of optimization control. Empirically, an actual output signal is quite different from an ideal step function output, so that a complicated optimization control method is required to generate an output close to the ideal step function output. However, it is almost impossible to achieve a perfect step function output, and this is only for simple step functions. Secondly, a zooming power of most zoom lens elements will decrease significantly along with increase of an operating frequency, which greatly reduces an image formation range of an optical system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a control method of a light field display, where the control method is relatively simple.

Other objects and advantages of the invention may be further illustrated by the technical features broadly embodied and described as follows.

In order to achieve one or a portion of or all of the objects or other objects, an embodiment of the invention provides a control method of a light field display. The light field display includes a display module, a zoom lens, and a control unit. The display module includes a light source module and a display unit. The control method includes following steps. The control unit is used to input a focal length signal to the zoom lens, so that the zoom lens is periodically switched among a plurality of corresponding specific focal lengths. The control unit is used to input a corresponding display signal to the display unit of the display module according to one of the plurality of specific focal lengths, so that the display module generates one of a plurality of image lights, where the plurality of image lights respectively have different imaging distances corresponding to the plurality of specific focal lengths after passing through the zoom lens. The control unit is used to input a corresponding response time signal to the display module according to one of the plurality of specific focal lengths, so that the one of the plurality of image lights emitted by the display module passes through the zoom lens within one of a plurality of response time, so that the light field display projects the one of the plurality of image lights to form an image at the corresponding imaging distance.

Based on the above description, in an embodiment of the invention, according to the control method of the light field display, the zoom lens is periodically switched among a plurality of corresponding specific focal lengths, and a time during which each image light passes through the zoom lens is controlled according to the response time corresponding to the specific focal length. Therefore, compared to using a step function to control the image output, the control method of the embodiment of the invention uses a simple periodic function without being limited to a time length of a steady state of zoom lens control, so that the control method is simpler, and an actual imaging position of the image light is close to a theoretical value.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
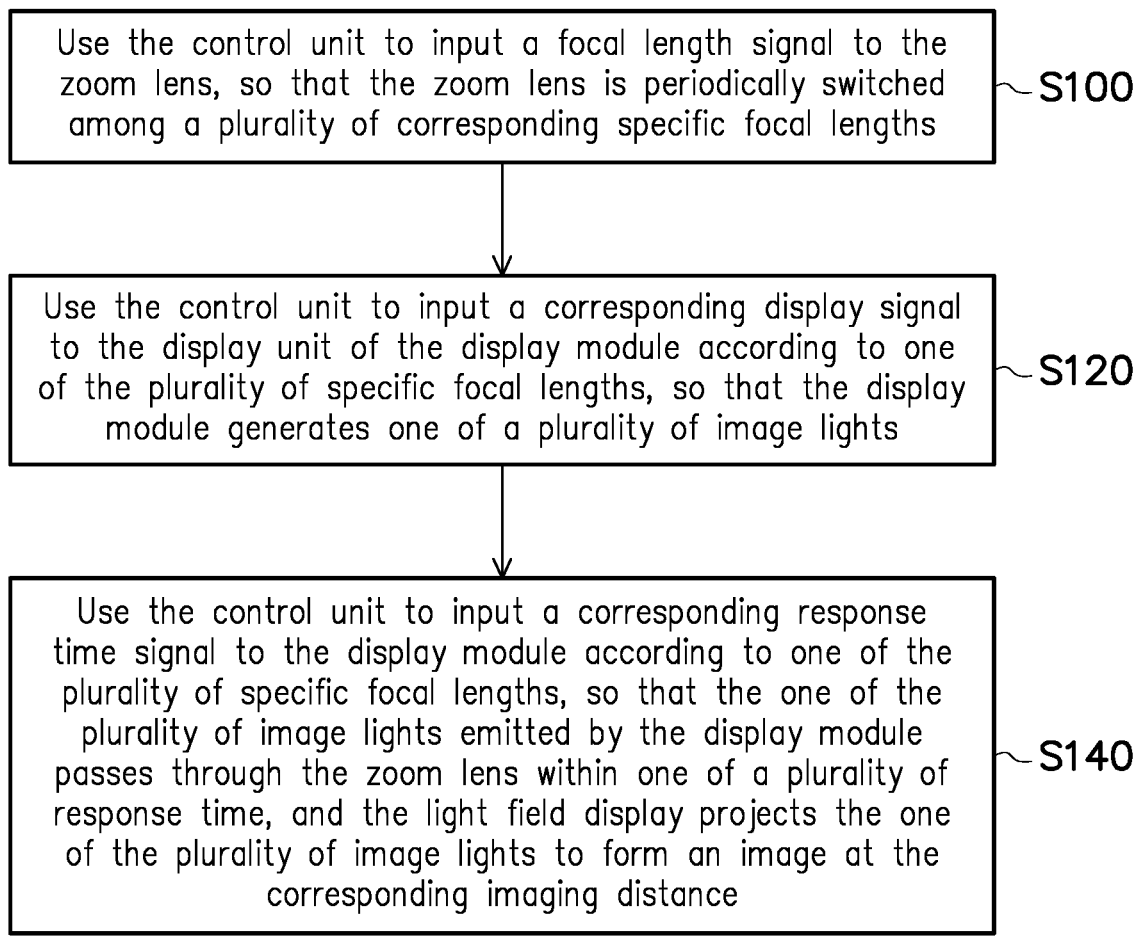
FIG. 1 is a flowchart of a control method of a light field display according to an embodiment of the invention.
Figure 2:
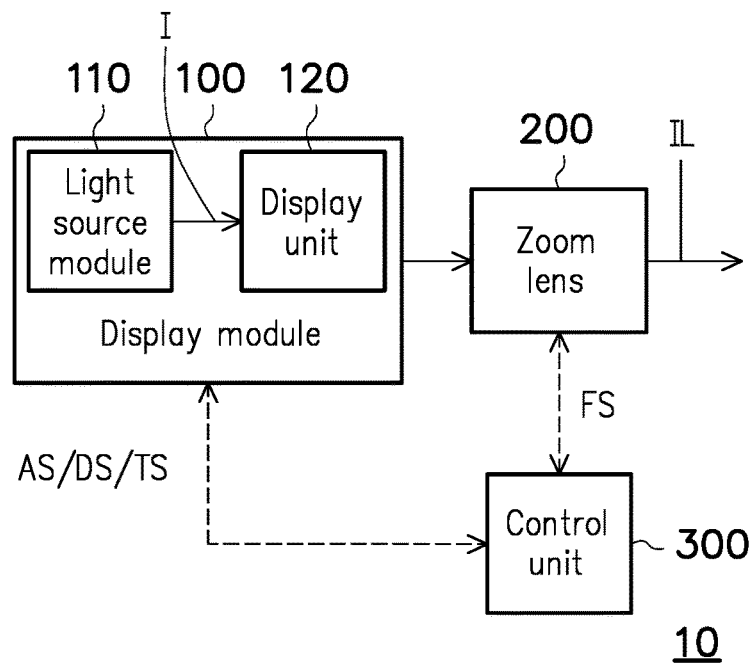
FIG. 2 is a block diagram of a light field display according to an embodiment of the invention.

FIG. 1 is a flowchart of a control method of a light field display according to an embodiment of the invention. FIG. 2 is a block diagram of a light field display according to an embodiment of the invention. Referring to FIG. 1 and FIG. 2, an embodiment of the invention provides a control method of a light field display 10. The light field display 10 includes a display module 100, a zoom lens 200 and a control unit 300. The display module 100 includes a light source module 110 and a display unit 120.

In the embodiment, the light source module 110 is configured to provide illumination light I, and the illumination light I is incident to the display unit 120. The light source module 110 is, for example, one or a plurality of laser diodes (LD), light-emitting diodes (LED) or other suitable light sources. The illumination light I is, for example, red light, green light, blue light, or other suitable color light or a combination thereof. The display unit 120 is located on a transmission path of the illumination light I, and is configured to convert the illumination light I into image light IL. The display unit 120 is, for example, a spatial light modulator such as a digital micro-mirror device (DMD), a liquid-crystal-on-silicon panel (LCOS panel), or a liquid crystal panel (LCD). In addition, the zoom lens 200 is, for example, a liquid crystal lens or a liquid lens.

In the embodiment, the control unit 300 includes, for example, a microcontroller unit (MCU), a single-chip microcontroller, a central processing unit (CPU), a microprocessor, a digital signal processor (DSP), a programmable controller, a programmable logic device (PLD) or other similar devices or combinations of these devices, which is not limited by the invention. Moreover, in an embodiment, each function of the control unit 300 may be implemented as a plurality of program codes. These program codes may be stored in a memory, and the control unit 300 may execute the program codes. Alternatively, in an embodiment, each function of the control unit 300 may be implemented as one or a plurality of circuits. Implementations of the functions of the control unit 300 by means of software or hardware are not limited by the invention.

In an embodiment, the control method includes following steps. In step S100, the control unit 300 is used to input a focal length signal FS to the zoom lens 200, so that the zoom lens 200 is periodically switched among a plurality of corresponding specific focal lengths. In step S120, according to one of the plurality of specific focal lengths, the control unit 300 is used to input a corresponding display signal DS to the display unit 120 of the display module 100, and the display module 100 generates one of a plurality of image lights IL, where the plurality of image lights IL respectively have different imaging distances corresponding to the plurality of specific focal lengths after passing through the zoom lens 200. In step S140, according to one of the plurality of specific focal lengths, the control unit 300 is used to input a corresponding response time signal TS to the display module 100, and one of the plurality of image lights IL emitted by the display module 100 passes through the zoom lens 200 within one of a plurality of response time, so that the light field display 10 projects one of the plurality of image lights IL to form an image at a corresponding imaging distance.

The following will describe in detail how to use a periodic function to determine the response time corresponding to different specific focal lengths, so that the control method of an embodiment of the invention may output image light close to a theoretical imaging position.

Figure 3:
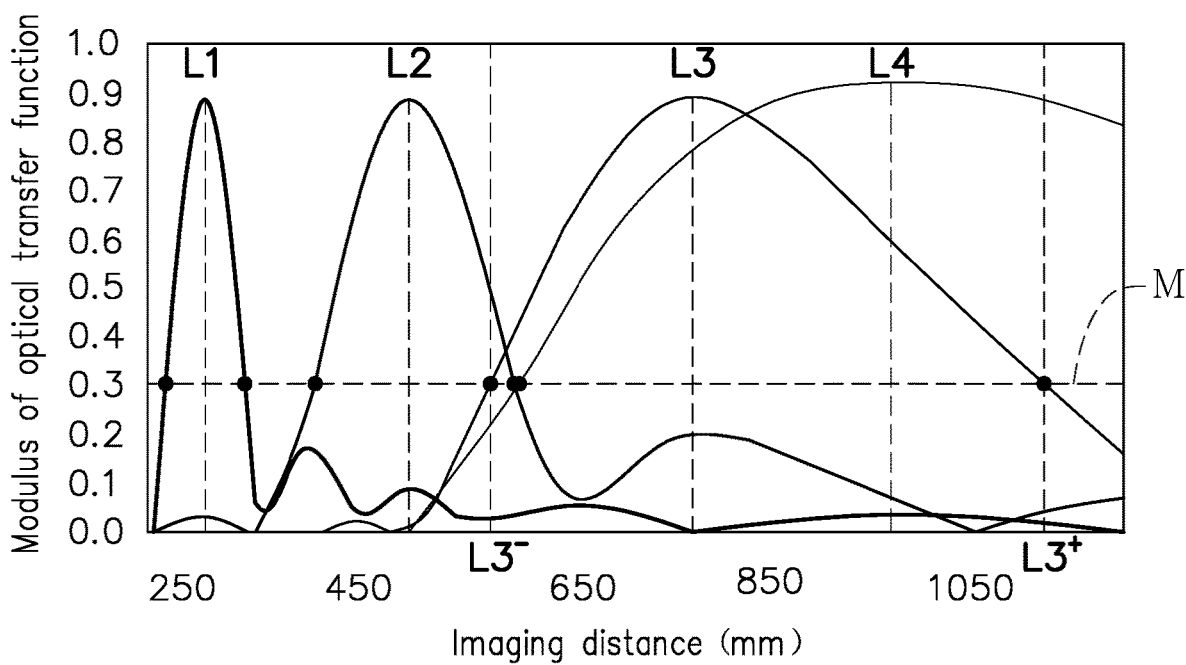
FIG. 3 is a schematic diagram of different specific focal lengths and corresponding preferable imaging distance ranges thereof according to a control method of a light field display of an embodiment of the invention.

FIG. 3 is a schematic diagram of different specific focal lengths and corresponding preferable imaging distance ranges thereof according to a control method of a light field display of an embodiment of the invention. Referring to FIG. 3, FIG. 3 illustrates that the zoom lens 200 may be switched among a plurality of specific focal lengths L1, L2, L3 and L4. Where, the different specific focal lengths L1, L2, L3 and L4 have different functional forms in a modulation transfer function (MTF). Generally, the larger a modulus of a vertical axis is, the better the image quality or image contrast is. When the modulus is greater than or equal to 0.3, a blur/clarity degree of the image light IL after passing through the zoom lens corresponding to the specific focal length has made it impossible for a human eye to judge a difference between different moduli. Namely, the specific modulus greater than or equal to 0.3 and smaller than or equal to 1.0 determines a preferable imaging distance range of each of the specific focal lengths L1, L2, L3 and L4, where the preferable imaging distance range represents the nearest position and the farthest position of the image that is clear and acceptable to the human eye relative to the zoom lens 200. Taking the specific focal length L3 as an example, two intersection points between the specific focal length L3 and a straight line M with the modulus of 0.3 determine the preferable imaging distance range of the specific focal length L3 on an imaging distance axis, i.e., a range between a nearest imaging position L3$^-$ and a farthest imaging positions L3$^+$. Moreover, since the intersection point between the specific focal length L4 and the straight line M with the modulus of 0.3 only forms the nearest imaging position, the farthest imaging position corresponding to the specific focal length L4 may be defined by the maximum focal length of the zoom lens 200.

Namely, in the embodiment, the nearest imaging position and the farthest imaging position of the specific focal length L1, L2, L3 or L4 corresponding to each response time are respectively the intersection points between its modulation transfer function and the straight line M formed by the specific modulus, and the preferable imaging distance range corresponding to each specific focal length L1, L2, L3 or L4 is defined by the minimum and maximum values of the intersection points on the imaging distance axis or by the minimum value and the maximum focal length of the zoom lens 200. The specific modulus is greater than or equal to 0.3 and smaller than or equal to 1.0.

Figure 4:
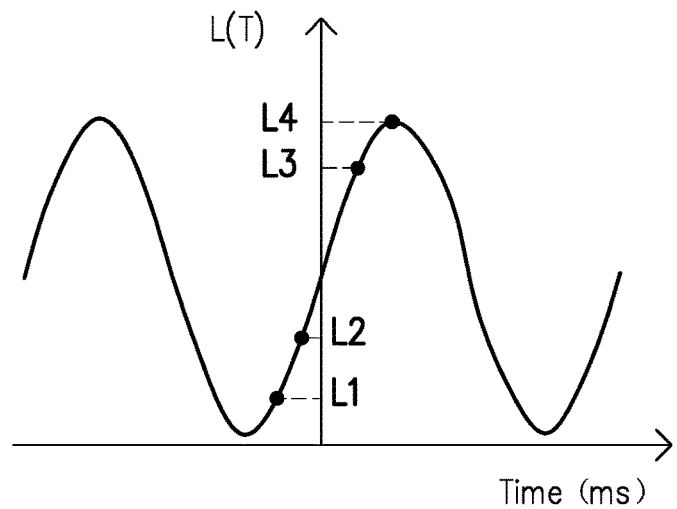
FIG. 4 is a curve diagram of a focal length characteristic function according to a control method of a light field display of an embodiment of the invention.
Figure 5:
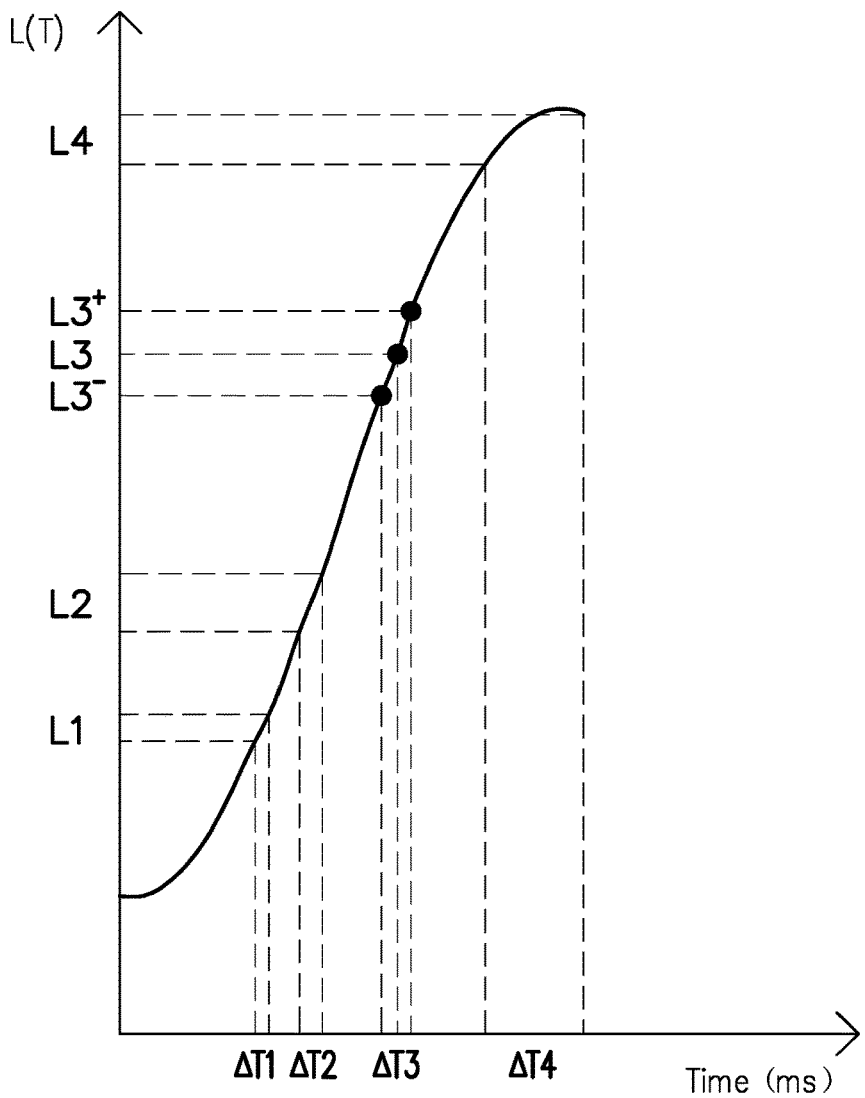
FIG. 5 is a schematic diagram of obtaining time differences corresponding to preferable imaging distance ranges according to a focal length characteristic function in a control method of a light field display according to an embodiment of the invention.

FIG. 4 is a curve diagram of a focal length characteristic function according to a control method of a light field display of an embodiment of the invention. FIG. 5 is a schematic diagram of obtaining time differences corresponding to preferable imaging distance ranges according to the focal length characteristic function in a control method of a light field display according to an embodiment of the invention. Referring to FIG. 4 and FIG. 5, based on the nearest imaging position and the farthest imaging position corresponding to each of the specific focal lengths L1, L2, L3 and L4, the control unit 300 controls the focal length of the zoom lens 200 to be changed among the different specific focal lengths L1, L2, L3 and L4 through the focal length signal FS. Since the step function has difficulties in signal processing, it is preferred to use a periodic function to generate the focal length signal FS. For example, FIGS. 4 and 5 illustrate that a focal length characteristic function L(T) is a sine function. In this way, the preferable imaging distance ranges (i.e., the ranges between the nearest imaging positions and the farthest imaging positions) corresponding to each of the specific focal lengths L1, L2, L3 and L4 respectively correspond to time differences ΔT1, ΔT2, ΔT3 and ΔT4 thereof under the focal length characteristic function L(T), for example, a time required for a virtual image corresponding to the specific focal length L3 to move from the nearest imaging position L3$^-$ to the farthest imaging position L3$^+$ according to the focal length characteristic function L(T) is ΔT3. In addition, these time differences ΔT1, ΔT2, ΔT3 and ΔT4 will determine response time Δt1, Δt2, Δt3 and Δt4 (i.e., corresponding to the response time signal TS in step S140) of the display unit 120 to correspondingly emit the image light IL when the zoom lens 200 is at each of the specific focal lengths L1, L2, L3 and L4. Although the periodic function is used to generate the focal length signal FS while it is calculated that the respective response time Δt1, Δt2, Δt3 and Δt4 of the display unit 120 to emit the image light IL are not perfect theoretical values, by using the specific modulus to limit the response time Δt1, Δt2, Δt3 and Δt4, the human eye cannot judge an error in the imaging position.

Namely, in the embodiment, the control method further includes following steps: Each response time is determined according to the time difference ΔT1, ΔT2, ΔT3 or ΔT4 corresponding to the preferable imaging distance ranges of the focal length characteristic function L(T), and the control unit 300 outputs the corresponding response time signal TS to the display unit 120 according to the response time.

In an embodiment, the focal length characteristic function may be: L(T)=a×sin(bT+c), wherein a, b and c are characteristic parameters, and T is a time period.

In addition to determining the time difference ΔT1, ΔT2, ΔT3 or ΔT4 according to the focal length characteristic function L(T) and the specific modulus, the actual response time Δt1, Δt2, Δt3, Δt4 corresponding to each of the specific focal lengths L1, L2, L3, L4 are preferably determined by the minimum brightness and minimum contrast perceivable by human eyes. Namely, if the minimum brightness and the minimum contrast perceivable by human eyes are satisfied, the time difference ΔT1, ΔT2, ΔT3 or ΔT4 is equal to the response time Δt1, Δt2, Δt3 or Δt4. Conversely, if the minimum brightness and the minimum contrast perceivable by human eyes are not satisfied, the response time Δt1, Δt2, Δt3 or Δt4 is adjusted according to the minimum brightness and the minimum contrast perceivable by human eyes.

Figure 6:
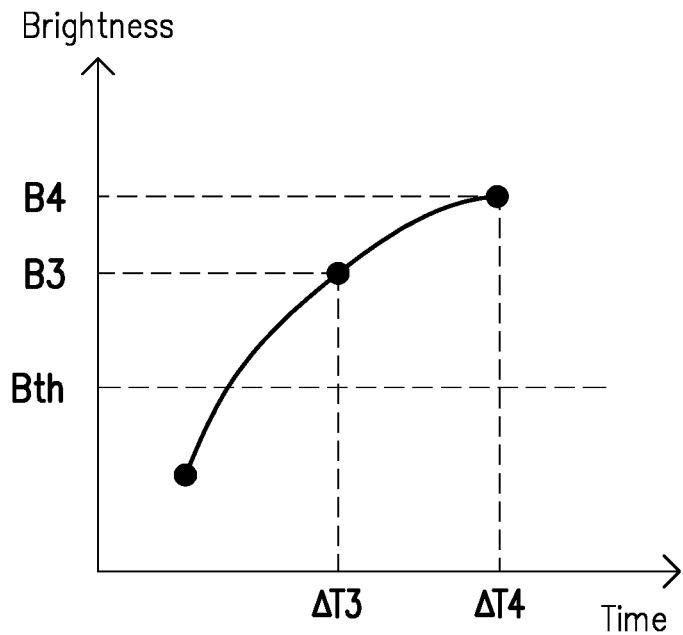
FIG. 6 is a curve diagram of a brightness characteristic function according to a control method of a light field display of an embodiment of the invention.

FIG. 6 is a curve diagram of a brightness characteristic function according to a control method of a light field display of an embodiment of the invention. A brightness characteristic function B(ΔT) shown in FIG. 6 is: $B(\Delta T)=d \times e^{g/\Delta T}+h$, where d, g, and h are brightness characteristic parameters, and ΔT is a time difference. Referring to FIG. 6, based on the above-mentioned brightness characteristic function B(ΔT), brightness values B1, B2, B3, B4 corresponding to an image received by the human eye may be calculated respectively according to each of the time differences ΔT1, ΔT2, ΔT3, ΔT4 corresponding to the focal length characteristic function L(T) in these preferable imaging distance ranges. For example, In FIG. 6, the brightness values corresponding to the time differences ΔT3 and ΔT4 are respectively B3 and B4. Where, the maximum value in the brightness values B1, B2, B3 and B4 corresponding to the time differences ΔT1, ΔT2, ΔT3 and ΔT4 is defined as the maximum brightness value. Since the brightness characteristic function B(ΔT) of the embodiment is an increasing function, the brightness value calculated according to the maximum value ΔTmax of the time differences ΔT1, ΔT2, ΔT3 and ΔT4 may be the maximum brightness value. For example, in FIG. 5, the maximum time difference calculated according to the focal length characteristic function L(T) is ΔT4, the time difference ΔT4 is then the maximum value ΔTmax, and its brightness value B(ΔTmax) (equal to B4) is the maximum brightness value. Moreover, Bth on the vertical axis of FIG. 6 is the minimum brightness value perceivable by human eyes. Therefore, if the brightness value corresponding to each of the time differences ΔT1, ΔT2, ΔT3, ΔT4 is lower than the minimum brightness value Bth, the corresponding response time Δt1, Δt2, Δt3, or Δt4 thereof may be adjusted to (calculated according to the brightness characteristic function B(ΔT)) a time corresponding to the minimum brightness value Bth or a time corresponding to the maximum brightness value B(ΔTmax). Alternatively, in an embodiment, the response time Δt1, Δt2, Δt3 and Δt4 must be greater than or equal to the time corresponding to the minimum brightness value Bth (calculated according to the brightness characteristic function B(ΔT)), and less than or equal to the time corresponding to the maximum brightness value B(ΔTmax).

Namely, in the embodiment, determination of each response time Δt1, Δt2, Δt3, Δt4 includes the following steps: The maximum brightness value B(ΔTmax) is calculated according to the brightness characteristic function B(ΔT), where the maximum brightness value B(ΔTmax) is a brightness value of the maximum value ΔTmax in the plurality of time differences ΔT1, ΔT2, ΔT3, and ΔT4 corresponding to the plurality of specific focal lengths L1, L2, L3, and L4 in the brightness characteristic function B(ΔT).

Figure 7:
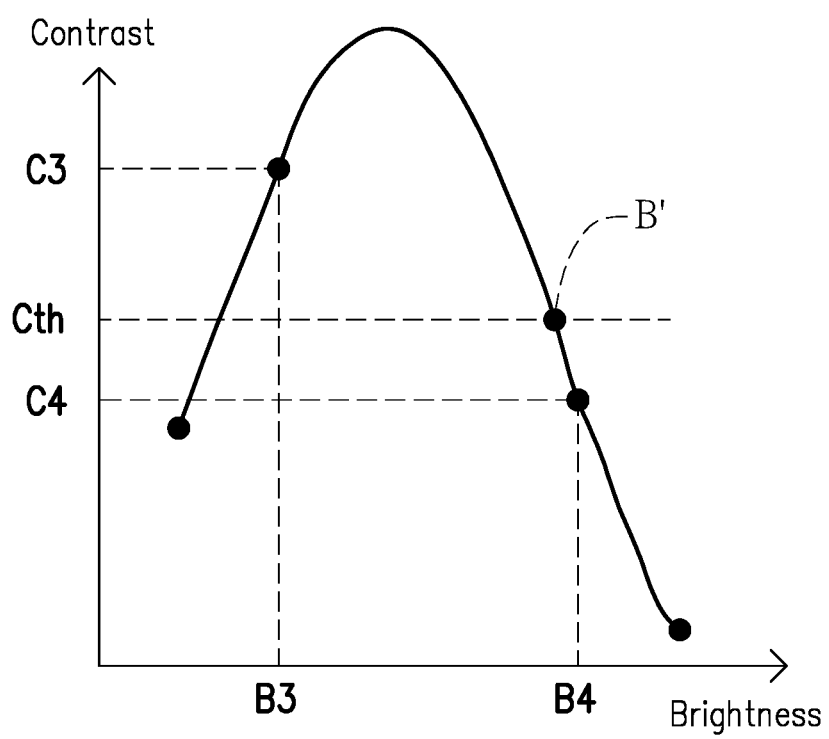
FIG. 7 is a curve diagram of a contrast characteristic function according to a control method of a light field display of an embodiment of the invention.

FIG. 7 is a curve diagram of a contrast characteristic function according to a control method of a light field display of an embodiment of the invention. A contrast characteristic function C(B) in FIG. 7 is:

$$C(B) = \frac{q}{B \times \sigma} e^{-r \frac{(\ln B - \mu)^2}{2\sigma^2}} + s,$$

where q, r, s, μ, and σ are brightness characteristic parameters, and B is a brightness value. Referring to FIG. 7, according to the above-mentioned brightness values B1, B2, B3 and B4, contrasts C1, C2, C3, and C4 of the corresponding image may be respectively calculated based on the contrast characteristic function C(B). For example, the contrast of the image corresponding to the brightness values B3 and B4 in FIG. 7 are respectively C3 and C4. Cth on the vertical axis of FIG. 7 is the minimum contrast perceivable by human eyes. Therefore, if the contrast corresponding to the brightness value is smaller than the minimum contrast Cth, for example, the contrast C4 of the image corresponding to the brightness value B4 in FIG. 7 is smaller than the minimum contrast Cth, the brightness value thereof may be adjusted to the maximum brightness value B' corresponding to the minimum contrast Cth, or adjusted to the above-mentioned minimum brightness value Bth or the brightness value B(ΔTmax), and then the adjusted brightness value is used to calculate a correct response time Δt of the image light IL output from the display unit 120.

In brief, in the embodiment, determination of each response time Δt1, Δt2, Δt3 and Δt4 further includes a following step: According to the contrast characteristic function C(B), it is determined whether each response time Δt1, Δt2, Δt3, or Δt4 satisfies a following first conditional function: B(ΔT)≤(ΔTmax), B(ΔT)≥Bth, and C(B (ΔT))≥Cth.

In the embodiment, determination of each response time Δt1, Δt2, Δt3, Δt4 further includes a following step: If the above-mentioned first conditional function is satisfied, each response time Δt1, Δt2, Δt3, Δt4 is the time difference ΔT1, ΔT2, ΔT3, ΔT4 thereof.

In the embodiment, determination of each response time Δt1, Δt2, Δt3, Δt4 further includes a following step: If the first conditional function is not satisfied, each response time Δt1, Δt2, Δt3, Δt4 is a time value corresponding to B(ΔTmax) or Bth, and each response time Δt1, Δt2, Δt3, Δt4 satisfies a following second conditional functions: B(Δt)≤ (ΔTmax), B(Δt)≥Bth, and C(B (Δt))≥Cth, where Δt is each response time.

In the embodiment, determination of each response time Δt1, Δt2, Δt3, Δt4 further includes following steps. The control unit 300 outputs an adjustment signal AS to the display module 100 according to the brightness value (according to the brightness characteristic function B(ΔT)) and the contrast (according to the contrast characteristic function C(B)) calculated according to each response time Δt1, Δt2, Δt3, Δt4, and the light source module 110 of the display module 100 adjusts the illumination light I output to the display unit 120 according to the adjustment signal AS or/and the display unit 120 of the display module 100 adjusts a time of outputting the image light IL according to the adjustment signal AS.

In the embodiment, the above-mentioned step of using the control unit 300 to input the focal length signal FS to the zoom lens 200, so that the zoom lens 200 is periodically and continuously switched among a plurality of corresponding specific focal lengths L1, L2, L3, and L4 further includes a following step. The zoom lens 200 periodically modulates a diopter thereof according to a sine wave driving signal (for example, the sine function shown in FIG. 4), so that the plurality of image lights IL from the display module 100 pass through the zoom lens 200 at different times to have different imaging distances corresponding to the specific focal lengths L1, L2, L3, L4.

TABLE 1

| | |
|---|---|
| a | 0.1 |
| b | 0.5 |
| c | 0.1 |
| d | 3 |
| g | 0.05 |
| h | 0.01 |
| q | 0.2 |
| r | 0.6 |
| s | 0.2 |
| μ | 0.2 |
| σ | 0.1 |
| Δtmax | 0.268 |
| Δtmin | 0.122 |
| Bmax | 2.500 |
| Bmin | 2.000 |
| Cmax | 0.372 |
| Cmin | 0.682 |

TABLE 2

| | Time difference $\Delta T$ | Brightness value B | Contrast C | Logical judgment | Response time $\Delta t$ | Output brightness value | Output contrast |
|---|---|---|---|---|---|---|---|
| L1 | 0.141 | 2.117 | 0.582 | 1 | 0.141 | 2.117 | 0.582 |
| L2 | 0.281 | 2.521 | 0.364 | 0 | 0.268 | 2.500 | 0.372 |
| L3 | 0.432 | 2.682 | 0.316 | 0 | 0.268 | 2.500 | 0.372 |
| L4 | 0.701 | 2.803 | 0.290 | 0 | 0.268 | 2.500 | 0.372 |

For example, a, b and c in the above Table 1 are a set of characteristic parameters of the focal length characteristic function L(T), d, g and h are a set of brightness characteristic parameters of the brightness characteristic function B($\Delta T$), and q, r, s, $\mu$ and $\sigma$ are a set of brightness characteristic parameters of the contrast characteristic function C(B). $\Delta tmax$ and $\Delta tmin$ are respectively the maximum response time and the minimum response time that may be obtained according to the above-mentioned characteristic parameters under the condition of satisfying the above-mentioned first conditional function and second conditional function. Bmax and Cmax are the brightness value and contrast corresponding to $\Delta tmax$, and Bmin and Cmin are the brightness value and contrast corresponding to $\Delta tmin$. In an embodiment, Bmax may be set to the minimum brightness value Bth or the brightness value B($\Delta Tmax$), and $\Delta tmax$ and Cmax may be a time difference and contrast corresponding to the minimum brightness value Bth or the brightness value B($\Delta Tmax$).

Table 2 shows the time differences $\Delta T1$, $\Delta T2$, $\Delta T3$, $\Delta T4$ calculated according to a set of specific focal lengths L1, L2, L3, and L4 based on the focal length characteristic function L(T), the brightness values B1, B2, B3, B4 respectively calculated according to the time differences $\Delta T1$, $\Delta T2$, $\Delta T3$, $\Delta T4$ based on the brightness characteristic function B($\Delta T$), and the contrasts C1, C2, C3, and C4 respectively calculated according to the time differences $\Delta T1$, $\Delta T2$, $\Delta T3$, and $\Delta T4$ based on the contrast characteristic function C(B). Where, the logical judgment represents whether the brightness values B1, B2, B3, B4 and the contrasts C1, C2, C3, C4 corresponding to each of the time differences $\Delta T1$, $\Delta T2$, $\Delta T3$, $\Delta T4$ satisfy the above-mentioned first and second conditional functions. Since the brightness value B1 and the contrast C1 calculated based on the specific focal length L1 satisfy the first conditional function and the second conditional function, the response time $\Delta t1$ of the image light IL output by the display unit 120 corresponding to the specific focal length L1 is equal to the time difference $\Delta T1$ generated according to the corresponding preferable imaging distance range thereof. Since the brightness values B2, B3, B4 and the contrasts C2, C3, and C4 respectively calculated based on the specific focal lengths L2, L3, and L4 cannot satisfy the first conditional function and the second conditional function at the same time, the response time $\Delta t2$, $\Delta t3$, and $\Delta t4$ of the specific focal lengths L2, L3, L4 are set as the response time $\Delta tmax$.

In summary, in an embodiment of the invention, in an embodiment of the invention, according to the control method of the light field display, the zoom lens is periodically and continuously switched among a plurality of corresponding specific focal lengths, and a time during which each image light passes through the zoom lens is controlled according to the response time corresponding to the specific focal length when the display unit outputs the image light. Therefore, compared to using a step function to control the image output, the control method of the embodiment of the invention uses a simple periodic function without being limited to a time length of a steady state of zoom lens control, so that the control method is simpler, and an actual imaging position of the image light is close to a theoretical value as human eyes cannot judge an error value thereof.

Besides, the control method of the embodiment of the invention further optimizes the response time by using the brightness characteristic function B($\Delta T$), the minimum brightness value Bth perceivable by human eyes, the contrast characteristic function C(B) and the minimum contrast Cth perceivable by human eyes. Therefore, according to the control method of the embodiment of the invention, the light field display may provide the best viewing quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A control method of a light field display, the light field display comprising a display module, a zoom lens, and a control unit, the display module comprising a light source module and a display unit, and the control method comprising:
   using the control unit to input a focal length signal to the zoom lens, so that the zoom lens is periodically switched among a plurality of corresponding specific focal lengths;
   using the control unit to input a corresponding display signal to the display unit of the display module according to one of the plurality of specific focal lengths, so that the display module generates one of a plurality of image lights, wherein the plurality of image lights respectively have different imaging distances corresponding to the plurality of specific focal lengths after passing through the zoom lens;
   using the control unit to input a corresponding response time signal to the display module according to one of the plurality of specific focal lengths, so that the one of the plurality of image lights emitted by the display module passes through the zoom lens within one of a plurality of response time, and the light field display projects the one of the plurality of image lights to form an image at the corresponding imaging distance; and
   determining each response time according to a time difference corresponding to a focal length characteristic function between a nearest imaging position and a farthest imaging position, and outputting the corresponding response time signal by the control unit according to the response time,
   wherein the nearest imaging position and the farthest imaging position of a specific focal length corresponding to each response time are respectively intersection points between a modulation transfer function thereof and a straight line formed by a specific modulus, and are defined by a minimum value and a maximum value of the intersection points on an imaging distance axis or by the minimum value and a maximum focal length of the zoom lens.

2. The control method of the light field display as claimed in claim 1, wherein the focal length characteristic function is:

$L(T)=a \times \sin(bT+c)$, where a, b, and c are characteristic parameters, and T is time.

3. The control method of the light field display as claimed in claim 1, wherein the specific modulus is greater than or equal to 0.3 or smaller than or equal to 1.0.

4. The control method of the light field display as claimed in claim 1, wherein the step of determining each response time comprises:
   calculating a maximum brightness value according to a brightness characteristic function,
   wherein the maximum brightness value is a brightness value of a maximum value in a plurality of time differences corresponding to the plurality of specific focal lengths in the brightness characteristic function.

5. The control method of the light field display as claimed in claim 4, wherein the brightness characteristic function is:

$B(\Delta T) = d \times e^{-\frac{g}{\Delta T}} + h$, where d, g and h are brightness characteristic parameters, and $\Delta T$ is the time difference.

6. The control method of the light field display as claimed in claim 4, wherein the step of determining each response time further comprises:
   determining whether each response time complies with a following first conditional function according to a contrast characteristic function:

$B(\Delta T) \leq B(\Delta T \max)$, $B(\Delta T) \geq Bth$, and $C(B(\Delta T)) \geq Cth$, where $\Delta T$ is the time difference, $\Delta T\max$ is the maximum value in the plurality of time differences, Bth is a minimum brightness value perceivable by human eyes, function C is the contrast characteristic function, and Cth is a minimum contrast perceivable by human eyes.

7. The control method of the light field display as claimed in claim 6, wherein the contrast characteristic function is:

$$C(B) = \frac{q}{B \times \sigma} e^{-r \frac{(\ln B - \mu)^2}{2\sigma^2}} + s,$$

where q, r, s, $\mu$ and $\sigma$ are brightness characteristic parameters, and B is a brightness value.

8. The control method of the light field display as claimed in claim 6, wherein the step of determining each response time further comprises:
   making each response time to be the time difference if the first conditional function is satisfied.

9. The control method of the light field display as claimed in claim 6, wherein the step of determining each response time further comprises:
   making each response time to be a time value corresponding to $B(\Delta T\max)$ or Bth, and making each response time satisfying a following second conditional function if the first conditional function is not satisfied:

$B(\Delta t) \leq B(\Delta T \max)$, $B(\Delta t) \geq Bth$, and $C(B(\Delta t)) \geq Cth$, where $\Delta t$ is each response time.

10. The control method of the light field display as claimed in claim 6, wherein the step of determining each response time further comprises: outputting an adjustment signal to the display module by the control unit according to the brightness value and a contrast calculated according to each response time, so that the light source module of the display module adjusts an illumination light output to the display unit according to the adjustment signal.

11. The control method of the light field display as claimed in claim 1, wherein the step of using the control unit to input the focal length signal to the zoom lens, so that the zoom lens is periodically switched among the plurality of corresponding specific focal lengths comprises: periodically modulating a diopter of the zoom lens according to a sine wave driving signal, so that the plurality of image lights from the display module pass through the zoom lens at different times to have the different imaging distances.

* * * * *